US012759627B2

(12) United States Patent
Bohn

(10) Patent No.: US 12,759,627 B2
(45) Date of Patent: Oct. 13, 2026

(54) STEERING SYSTEM

(71) Applicant: Schaeffler Technologies AG & Co. KG, Herzogenaurach (DE)

(72) Inventor: Juergen Bohn, Langensendelbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 444 days.

(21) Appl. No.: 18/279,740

(22) PCT Filed: Mar. 1, 2021

(86) PCT No.: PCT/DE2021/100201
§ 371 (c)(1),
(2) Date: Aug. 31, 2023

(87) PCT Pub. No.: WO2022/184194
PCT Pub. Date: Sep. 9, 2022

(65) Prior Publication Data

US 2024/0132151 A1 Apr. 25, 2024
US 2024/0227934 A9 Jul. 11, 2024

(51) Int. Cl.
*B62D 7/15* (2006.01)
*B62D 15/02* (2006.01)
*B62D 5/00* (2006.01)

(52) U.S. Cl.
CPC ............. *B62D 7/15* (2013.01); *B62D 15/021* (2013.01); *B62D 5/001* (2013.01)

(58) Field of Classification Search
CPC ........ B62D 7/15; B62D 15/021; B62D 5/001; B62D 7/09; B62D 5/0418; B62D 5/0481
See application file for complete search history.

(56) References Cited

U.S. PATENT DOCUMENTS

| | | | | | |
|---|---|---|---|---|---|
| 3,633,701 | A | | 1/1972 | Letourneau et al. | |
| 3,823,899 | A | * | 7/1974 | Currey | B64C 25/505 244/103 W |
| 4,366,756 | A | * | 1/1983 | Brum | G05D 1/0227 180/401 |
| 4,471,280 | A | * | 9/1984 | Stack | B62D 5/0463 244/184 |
| 4,500,818 | A | * | 2/1985 | Konrad | B60L 15/2036 318/52 |

(Continued)

FOREIGN PATENT DOCUMENTS

| | | | |
|---|---|---|---|
| CN | 109963766 | A | 7/2019 |
| DE | 4334279 | A1 | 4/1995 |

(Continued)

*Primary Examiner* — Valentin Neacsu
*Assistant Examiner* — Marlon A Arce
(74) *Attorney, Agent, or Firm* — Volpe Koenig

(57) ABSTRACT

A steering system for a vehicle including at least one pair of wheel units which can be actuated and deflected independently of each other. Each wheel unit is paired with at least one sensor device for detecting a deviation from a specified deflection of the wheel units relative to each other, and each wheel unit is paired with at least one actuation device in order to actuate the wheel units. At least one control unit is designed to actuate the actuation devices of the wheel units when the sensor devices detect a specified deviation of the specified deflection of the wheel units relative to each other.

15 Claims, 2 Drawing Sheets

(56) References Cited

U.S. PATENT DOCUMENTS

| | | | | | |
|---|---|---|---|---|---|
| 4,778,023 | A * | 10/1988 | Sugasawa | B62D 7/159 | 180/415 |
| 6,314,354 | B1 * | 11/2001 | Shimizu | B60Q 1/0082 | 701/41 |
| 7,059,447 | B1 * | 6/2006 | Andonian | B62D 5/0451 | 180/443 |
| 8,403,257 | B2 * | 3/2013 | Hissong | B64C 25/405 | 244/50 |

FOREIGN PATENT DOCUMENTS

| | | | |
|---|---|---|---|
| DE | 10244141 | A1 | 4/2004 |
| DE | 102004001318 | A1 | 8/2004 |
| DE | 102004026067 | A1 | 2/2005 |
| DE | 102005019337 | A1 | 12/2005 |
| DE | 102016223332 | A1 | 5/2018 |
| FR | 2909064 | B1 | 1/2009 |

* cited by examiner

STEERING SYSTEM

CROSS-REFERENCE TO RELATED APPLICATIONS

This application is the U.S. National Phase of PCT Appln. No. PCT/DE2021/100201, filed Mar. 1, 2021, the entire disclosure of which is incorporated by reference herein.

TECHNICAL FIELD

The present disclosure relates to a steering system for vehicles with at least one pair of wheel units that can be actuated and deflected independently of each other, a vehicle with such a steering system and the use of such a steering system in a vehicle.

BACKGROUND

Steering systems with independently actuatable and deflectable wheel units are known in particular from vehicles that include what is termed a steer-by-wire steering system. In such steering systems, the driver's steering commands are no longer transmitted mechanically via a steering gear that is physically connected to the wheels to be steered, but with an electronic acquisition of the drivers steering commands which are converted to electronic control signals by means of a control unit and then to the respective actuators of the wheels are released to be able to provide a corresponding deflection of the wheels.

Respective steering systems for vehicles are known from DE 10 2004 001 318 A, DE 102 44 141 A1 and DE 10 2016 223 332 A1. These steering systems include at least one pair of wheel units that can be actuated and deflected independently of each other. Each of these wheel units has a sensor device for detecting a deviation from a specified deflection of the wheel units. In addition, each is assigned an actuation device for actuating the wheel units.

It has now turned out that there is a further need to further improve such a steer-by-wire steering system or to provide an alternative for such steer-by-wire steering systems.

SUMMARY

Against this background, it is an object of the present disclosure to provide an improved steering system that can be used in addition to a known steer-by-wire steering system or as an alternative to the previously known steer-by-wire steering systems. This and other objects that could be mentioned or recognized by a person skilled in the art upon reading the following description are achieved by the subject matter of the independent claims. The dependent claims further form the central idea of the present disclosure in a particularly advantageous manner.

A steering system according to the disclosure for a vehicle comprises: at least one pair of wheel units which can be actuated and deflected independently of each other; wherein each wheel unit is paired with at least one sensor device for detecting a deviation from a specified deflection of the wheel units relative to each other; and wherein at least one, preferably each, wheel unit is paired with least one actuation device to actuate the wheel units; at least one control unit which is designed to actuate the actuation devices of the wheel units when the sensor devices detect a specified deviation of the specified deflection of the wheel units relative to each other.

In other words, the present disclosure proposes, in the case of at least two wheel units of a vehicle, to detect whether the relative position/deflection thereof deviates from a specified relative position/deflection, or if this exceeds a specified maximum deviation. If a specified/predefined deviation of the deflection of the at least two wheel units relative to each other is determined, the control unit can counteract this accordingly and the two wheel units can be brought back into a corresponding alignment relative to each other by means of the actuation devices. The present disclosure can thus be used to determine whether, for example, two front wheel units of a vehicle are still deflected or positioned synchronously relative to each other or synchronously relative to each other within a specified range, as should be the case for proper operation. In addition, electronic synchronization of at least two wheel units can be provided by the present disclosure. Thus, the function of a steering axle, with which wheel units can be mechanically positioned relative to each other, is simulated, and a kind of virtual steering axle can be provided. The present disclosure can be used as additional redundancy for a central control system to increase the operational reliability and error tolerance in the control and steering of a vehicle, or as an alternative to a central control system.

The present disclosure is based on the finding that the omission of the mechanical wheel axles and the corresponding mechanical steering mechanisms can be problematic in certain situations, for example when a central control unit of a steer-by-wire steering system fails or when the primary steering hardware and/or logic does not is operating properly such that non-synchronized wheel unit alignments can result during operation which can result in serious vehicle or wheel unit interference/damage or undesirable, potentially dangerous vehicle driving behavior.

The term sensor device is to be understood broadly in the present case and includes all electronic, mechanical, and other means with which an alignment of a wheel unit or a synchronous arrangement/positioning of at least two wheel units can be determined. A sensor device can also be designed in such a way that it can detect the alignment of two or more wheel units. The term actuation device is also to be understood broadly in the present case and nearly all means with which the orientation/deflection of a wheel unit can be changed. Finally, the term control unit is also to be understood broadly in the present case and includes all one-part and multi-part control arrangements that are suitable for processing the data from the sensor device(s) and delivering corresponding control commands to the actuation devices and thus providing a change in position of the corresponding wheel units.

In this context, it should be pointed out that the present disclosure is not limited to a specific wheel constellation or to the "synchronization" of specific wheel units. For example, a left wheel unit pair, a right wheel unit pair, a front wheel unit pair and/or a rear wheel unit pair or other wheel units can be synchronized with each other. The present disclosure also includes operating modes in which a wheel unit can function as a "master" wheel unit and the other wheel units are synchronized with this wheel unit. There is also the possibility of providing a pair of wheel drives as the "master" pair of wheel drives and the other pairs of wheel drives are synchronized with this pair of wheel drives. Finally, the present disclosure is also not limited to a specific number of wheel units or pairs of wheel units; in particular, the present disclosure includes vehicles with four wheel units, 6 wheel units, or also with three wheel units.

The control unit can be designed in such a way that the alignment and/or the speed of one or more wheel units is adjusted if a specified deviation in the deflection of the wheel units relative to each other is exceeded, i.e., if there is a synchronization error. For example, a potentially faulty wheel unit can be switched from a master mode to a slave mode or a freewheel mode to provide synchronization of the wheel units again. A corresponding warning message can also be sent to the vehicle's electronic control system or emitted to the driver.

The control unit can also be designed to adjust the orientation of a pair of rear wheel units according to the orientation of a pair of front wheel units, for example to reduce the turning radius of the vehicle. The orientation of a pair of rear wheel units can be the same as the orientation of a single front wheel unit. The orientation of a pair of rear wheel units can be made to correspond to the orientation of a pair of front wheel units, for example to enable special maneuvers such as sideways or diagonal driving of the vehicle. Furthermore, there is the possibility of adapting the driving mode of the wheel units in the light of the road condition and the road grip, which can be detected with corresponding sensor devices, for example to be able to provide better traction.

At least one connecting means is preferably provided between the sensor devices of two wheel units, which is designed to provide/deliver a tensile or compressive load to the sensor devices if the deflection of the wheel units relative to each other exceeds a specified deviation. For example, such a connecting means can be a hydraulic pressure cable connection and/or a rigid rod made of a pressure-resistant material such as metal, fiberglass, or aluminum. As long as the wheel units are arranged in parallel or synchronously, the connecting means does not transmit any tensile or compressive load to the or one of the sensor device(s). However, if the wheel units are no longer arranged as intended, the connecting means is pressed onto the or one of the sensor device(s), so that a corresponding deviation can be detected. In other words, the rigid connecting means is attached to both the left and right wheel units in such a way that the attachment points of the connecting means to the left and right wheel units remain unchanged when both the left and right wheel units maintain the same orientation. So if both wheel units change orientation in parallel, the connecting means will move accordingly and the attachment points will not be affected. However, if a wheel unit changes its alignment in a non-parallel manner, for example due to a mechanical wheel failure or a failure of the steering system, the connecting means is pushed or pulled, so that a deviation in alignment can be detected and the control unit can react accordingly, for example speed can be reduced, a faulty wheel unit can be switched to freewheel mode or slave mode, etc.

Advantageously, at least two connecting means are provided between the sensor devices of two wheel units, wherein the connecting means is firmly anchored on opposite sides in each case and being designed on the other opposite sides in each case to provide a tensile or compressive load on a respective sensor device when the deflection of the wheel units in relation to each other exceeds a specified deviation. For example, the two wheel units can be connected by two rigid connecting means, such as rods, connected to both the left and right wheel units, such that one connecting means (rod) is rigidly connected to a left wheel unit and another connecting means (rod) rigidly connected to the right wheel unit. In this preferred embodiment, two sensor devices are preferably provided on the respective wheel units, which are each rigidly engaged with one connecting means and are in sensory engagement with the other connecting means.

Furthermore, it is advantageous that at least one flexible connecting means is provided between the sensor devices, which is designed to deliver a measured variable that can be detected by the sensor devices when the deflection of the wheel units relative to each other exceeds a specified deviation. Such a flexible connecting means can be provided, for example, by a metal wire that is pulled or pushed, a rubber band the stress and strain level of which is measured, or a gas-filled hose that is modulated and generates a measurable positive and negative pressure at both ends.

The sensor devices preferably include sensor means that are designed to detect the respective deflection of a wheel unit and to transmit it to the control unit and/or to the other sensor devices by means of a wireless and/or wired signal connection. A wireless signal connection can be implemented, for example, by using appropriate radio signal standards. Magnetic field fluctuations, electromagnetic field fluctuations, ultrasonic signals, vibrations that are transmitted through the body or chassis of the vehicle, or light pulses that are used by the corresponding visible or non-visible range can also be used for a signal exchange. For example, radio communication, infrared light communication, current-modulated communication and/or ultra-wideband communication can be used to enable provision of a corresponding signal exchange. For example, information about speeds, orientations and other wheel drive properties that are significant to the situation-dependent safe and efficient driving of the vehicle can be exchanged between the wheel units or the control devices to enable the detection of synchronization errors and possible optimization of operation between the respective wheel units, with the aim of identifying and triggering measures to eliminate or compensate for detected synchronization errors, to restore a level of synchronized operation of the wheel units, or to optimize a coordinated operation of the wheel units.

It is also advantageous that the steering system is a steer-by-wire steering system and does not include a central control unit for the wheel units, wherein it is preferable for the wheel units not to be connected via a mechanical steering means.

Finally, it is advantageous that the steering system comprises at least a first pair of wheel units and at least a second pair of wheel units, and wherein one of the pairs of wheel units is actuated depending on the deflection of the wheel units of the other pair of wheel units. In this preferred embodiment, the first pair of wheel units can be controlled as a master pair and the second pair of wheel units can be actuated as a slave pair. In this context, a wide variety of configurations are conceivable in practice.

Furthermore, the present disclosure relates to a vehicle comprising at least one steering system as described above. Finally, the present disclosure relates to a use of a steering system described above in a vehicle.

BRIEF DESCRIPTION OF THE DRAWINGS

Further advantages and possible applications of the present disclosure result from the following description, the exemplary embodiment and the figures. In the figures.

DETAILED DESCRIPTION

Figure 1:
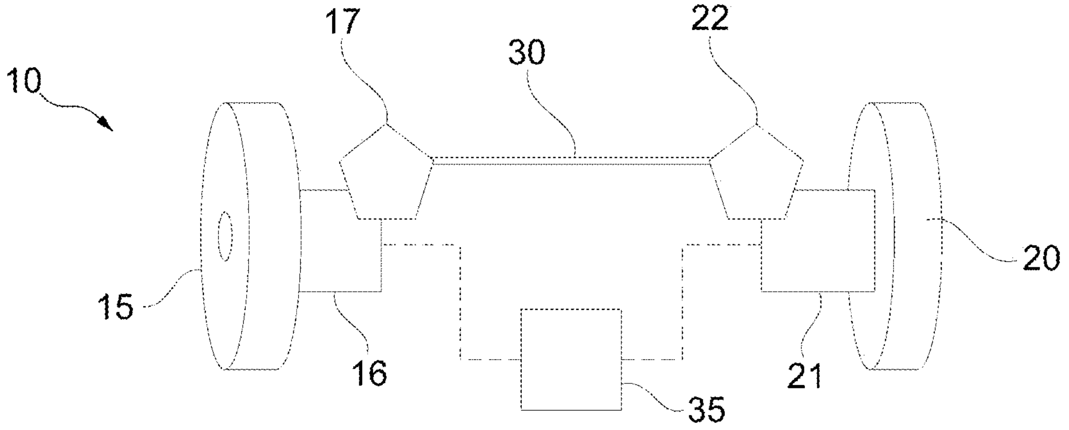
FIG. 1 shows a schematic view of the preferred embodiment of a steering system according to the disclosure.

FIG. 1 shows a schematic view of a first preferred embodiment of a steering system 10 according to the disclosure. The steering system 10 comprises a first wheel unit 15 and a second wheel unit 20.

The wheel units 15, 20 each comprise an actuating means 16, 21 by means of which the orientation of the wheel units 15, 20 can be changed. In addition, the wheel units 15, 20 each include a sensor device 17, 22 for detecting a deflection of the wheel units 15, 20, or for detecting a deviation in the alignments of the wheel units 15, 20 relative to each other. A connecting means 30 is arranged between the sensor devices 17, 22 in the preferred embodiment shown. Finally, the preferred embodiment shown comprises a central control unit 35. The control unit 35 serves to process the signals from the sensor devices 17, 22 and to control the actuation devices 16, 21. Alternatively, the control unit 35 can also be designed in several parts and/or also be integrated in the sensor devices 17, 22 and/or the actuating means 16, 21. As already explained, in addition to the control unit 35, a central control unit of a steer-by-wire system can also be provided.

The connecting means 30 can be designed, for example, to provide/deliver a tensile or compressive load to the sensor devices 17, 22 if the deflection of the wheel units 15, 20 relative to each other exceeds a specified deviation. For example, such a connecting means 30 can be a hydraulic pressure cable connection and/or a rigid rod made of a pressure-resistant material such as metal, fiberglass, or aluminum.

As long as the wheel units 15, 20 are arranged in parallel or synchronously (cf. FIG. 2), the connecting means 30 does not transmit any tensile or compressive load to the or one of the sensor device(s) 17, 22. However, if the wheel units 15, 20 are no longer arranged as intended (see FIGS. 3*a* and 3*b*), the connecting means 30 is pressed onto the or one of the sensor device(s) 17, 22, so that a corresponding deviation can be detected. The rigid connecting means 30 shown is attached to both the left and right wheel units 15, 20 in such a way that the attachment points of the connecting means 30 to the left and right wheel units 15, 20 remain unchanged when both the left and right wheel units 15, 20 maintain the same orientation (see FIG. 2). So if both wheel units 15, 20 change their alignment in parallel, the connecting means 30 moves accordingly and the attachment points are not affected. However, if a wheel unit 15, 20 changes its alignment in a non-parallel manner (cf. FIGS. 3*a* and 3*b*), for example due to a mechanical wheel failure or a failure of the steering system, the connecting means 30 is pressed or pulled so that a deviation in alignment is detected and the control unit 35 can react accordingly. The control unit 35 is preferably designed in such a way that when a specified deviation in the deflection of the wheel units 15, 20 relative to each other is exceeded, i.e., in the event of a synchronization error, for example caused by a faulty control signal from a central control unit of a steer-by-wire steering system, the alignment and/or the speed of one or more wheel units 15, 20 is adjusted. For example, a potentially faulty wheel unit 15, 20 can be switched from a master mode to a slave mode or a freewheel mode to provide synchronization of the wheel units 15, 20 again. A corresponding warning message can also be sent to the vehicle's electronic control system or emitted to the driver.

Alternatively, the connecting means 30 can also be provided by two rigid rods, each of which is firmly anchored on opposite sides and arranged on the other opposite sides to provide a tensile or compressive load on a respective sensor device 17, 22 when the deflection of the wheel units 15, 20 relative to each other exceeds a specified deviation. For example, the rods can be connected to both the left and the right wheel unit, so that one rod is firmly connected to a left wheel unit and the other rod is firmly connected to the right wheel unit, wherein the rods are connected at the opposite ends thereof to the respective wheel unit in sensory engagement with the respective sensor device 17, 22. Alternatively or additionally, the connecting means 30 can be embodied as a flexible connecting means 30 that is designed to deliver a measured variable that can be detected by the sensor devices 17, 22 when the deflection of the wheel units 15, 20 relative to each other exceeds a specified deviation. Such a flexible connecting means 30 can be provided, for example, by a metal wire that is pulled or pushed, a rubber band for which the tension and strain level is measured, or a gas-filled hose that is modulated and generates a positive and negative pressure that can be measured at both ends. Furthermore, the sensor devices 17, 22 can comprise a sensor means that is designed to detect the respective deflection of a wheel unit 15, 20 and to be transmitted by means of a wireless and/or wired connecting means 30 in the form of a signal connection to the control unit 35 and/or to the further sensor devices 17, 22. A wireless signal connection can be implemented, for example, by using appropriate radio signal standards. Magnetic field fluctuations, electromagnetic field fluctuations, ultrasonic signals, vibrations that are transmitted through the body or chassis of the vehicle, or light pulses that are used by the corresponding visible or non-visible range can also be used for a signal exchange. For example, radio communication, infrared light communication, current-modulated communication and/or ultra-wideband communication can be used to enable provision of a corresponding signal exchange.

Figure 2:
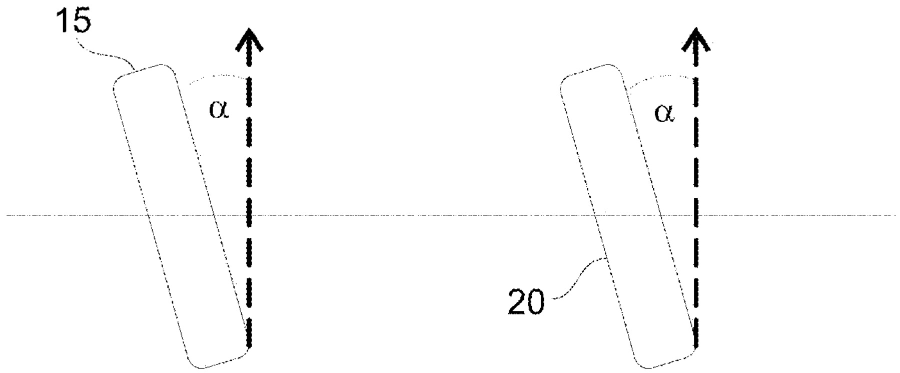
FIG. 2 shows a schematic view of a parallel alignment of the wheel units of a steering system according to the disclosure.
Figure 3A:
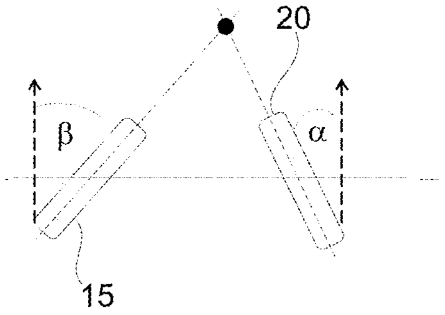
FIG. 3 two schematic views of a non-parallel alignment of the wheel units of a steering system according to the disclosure.
Figure 3B:
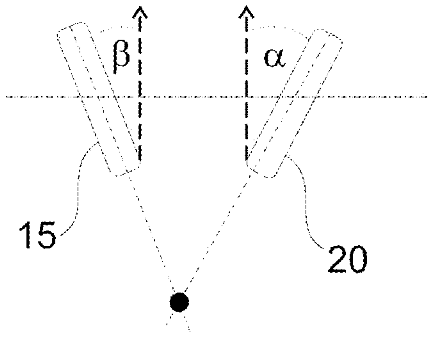

FIG. 2 shows an alignment of the wheel units 15, 20 in parallel normal operation, in which the two wheel units 15, 20 are aligned synchronously, i.e., both wheel units 15, 20 have the same angle $\alpha$ to a direction of travel. Two examples of a deviation in the alignment of the two wheel units 15, 20 relative to each other are shown in FIGS. 3*a* and 3*b*. In the examples shown, the angle $\beta$ of the left wheel unit 15 is smaller (see FIG. 3*a*) or larger (see FIG. 3*b*) than the angle $\alpha$, and the wheel units 15, 20 are no longer aligned synchronously relative to each other. In this context, it should be pointed out that the deviations or synchronization errors of the wheel units 15, 20 shown are only given as examples, and a wide variety of other incorrect alignments can be present. For example, the two wheel units 15, 20 with different angles can also point in the same direction. Such a non-synchronous constellation of the wheel units 15, 20 can also be detected and dealt with by the present disclosure.

Figure 4:
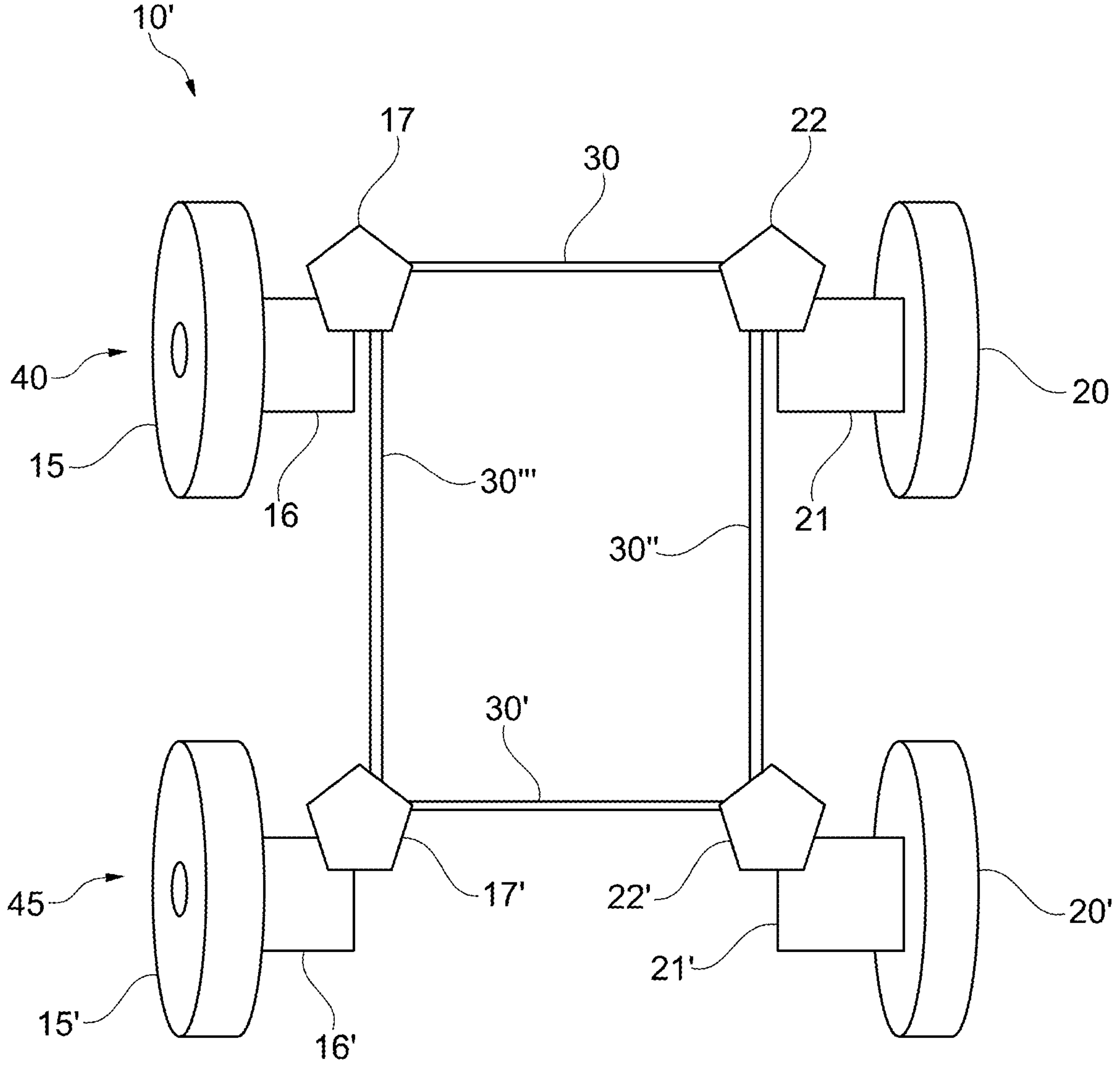
FIG. 4 shows a schematic view of a second preferred embodiment of a steering system according to the disclosure.

FIG. 4 shows a schematic view of a second preferred embodiment of a steering system 10 according to the disclosure. In contrast to the exemplary embodiment shown in FIG. 1, this exemplary embodiment includes two pairs of wheel units 15, 20, 15', 20'. In the preferred embodiment shown, the two wheel units 15, 20 form the front wheel units 40 and the two wheel units 15', 20' form the rear wheel units 45 of a vehicle. The wheel units 15, 20, 15', 20' in turn each comprise an actuating means 16, 21, 16', 21' by means of which the orientation of the wheel units 15, 20, 15', 20' can be changed. In addition, the wheel units 15, 20, 15', 20' each have a sensor device 17, 22, 17', 22' for detecting a deflection of the wheel units 15, 20, 15', 20' or for detecting a deviation in the alignments of the wheel units 15, 20, 15', 20' relative to each other. A connecting means 30 is arranged between the sensor devices 17, 22 in the preferred embodiment shown. In this embodiment shown, the control unit is integrated in one or in the four wheel units 15, 20, 15', 20', wherein the control unit can also be integrated in two or three of the wheel units 15, 20, 15', 20'. In this connection, it should be pointed out that the present disclosure is not limited to a specific constellation/distribution of the control unit(s). As can be seen clearly in FIG. 4, in this particularly preferred embodiment the wheel units 15, 20, 15', 20' are connected to each other with corresponding connecting means 30, 30', 30'', 30'''. In this exemplary embodiment, the control unit can also be designed to adjust the alignment of a pair of rear wheel units 45 in accordance with the alignment of a pair of front wheel units 40, for example, to reduce the turning radius of the vehicle. The orientation of a pair of rear wheel assemblies 45 can be the same as the orientation of a single front wheel assembly 15, 20. The orientation of a pair of rear wheel units 45 can be made to correspond to the orientation of a pair of front wheel units 40, for example to enable special maneuvers such as sideways or diagonal driving of the vehicle. There is also the possibility of adapting the driving mode of the wheel units 40, 45 in the light of the road condition and/or the road grip, which can be detected with corresponding sensor devices, for example to be able to provide better traction. As shown in FIG. 4, several redundant (virtual) pairings can also be generated between the wheel units 15, 20, and a wheel unit 15, 20 can also be synchronized with more than one other wheel unit 15', 20'' at the same time.

With the embodiments shown, it can thus be determined whether, for example, two front and/or rear wheel units 40, 45 are still deflected or positioned synchronously relative to each other, or synchronously with each other within a specified range, as should be the case for proper operation. Thus, the function of a steering axle, with which wheel units can be mechanically positioned relative to each other, is simulated, and a kind of virtual steering axle can be provided. The present disclosure can be used as additional redundancy for a central control system to increase the operational reliability and error tolerance in the control and steering of a vehicle, or as an alternative to a central control system.

However, the present disclosure is not limited to the previously preferred exemplary embodiments as long as it comprises the subject matter of the following claims.

LIST OF REFERENCE SYMBOLS

10 Steering system
15 First wheel unit
16 Actuation means
17 Sensor device
20 Second wheel unit
21 Actuation means
22 Sensor device
30 Connecting means
35 Control unit
40 Front wheel unit
45 Rear wheel unit

The invention claimed is:

1. A steering system for a vehicle, comprising:

at least one pair of wheel units configured to be actuated and deflected independently of each other;

each wheel unit being paired with a respective at least one sensor device for detecting a deviation from a specified deflection of the wheel units relative to each other;

at least one wheel unit being paired with at least one actuation device for actuating the wheel unit; and at least one control unit configured to actuate the at least one actuation device when the respective at least one sensor device paired with each wheel unit detect a specified deviation of the specified deflection of the wheel units relative to each other;

wherein at least one flexible connecting means is provided between the respective at least one sensor device paired with each wheel unit to deliver a measured variable that can be detected by the respective at least one sensor device paired with each wheel unit when the deflection of the wheel units relative to each other exceeds a specified deviation.

2. The steering system according to claim 1, wherein the at least one connecting means provides a tensile or compressive load to the respective at least one sensor device paired with each wheel unit when the deflection of the wheel units relative to each other exceeds a specified deviation.

3. The steering system according to claim 1, wherein at least two connecting means are provided between the respective at least one sensor device paired with each wheel unit, wherein each connecting means is anchored on one side and is configured on a second side to provide a tensile or compressive load to a respective at least one sensor device when the deflection of the wheel units relative to each other exceeds a specified deviation.

4. The steering system according to claim 1, wherein the respective at least one sensor device paired with each wheel unit comprise sensor means configured to detect a respective deflection of a wheel unit and to transmit same by means of at least one of a wireless or wired signal connection to the control unit or to further sensor devices.

5. The steering system according to claim 1, wherein the steering system is a steer-by-wire steering system and does not include a central control unit for the wheel units.

6. The steering system according to claim 1, wherein the wheel units are not connected via a mechanical steering means.

7. The steering system according to claim 1, wherein the steering system comprises at least a first pair of wheel units and at least a second pair of wheel units, and wherein one of the pairs of wheel units is actuated depending on the deflection of the wheel units of the other pair of wheel units.

8. A vehicle, comprising at least one steering system, the steering system including:

at least one pair of wheel units configured to be actuated and deflected independently of each other;

each wheel unit being paired with a respective at least one sensor device for detecting a deviation from a specified deflection of the wheel units relative to each other; and at least one wheel unit being paired with at least one actuation device for actuating the wheel unit;

at least one control unit configured to actuate the at least one actuation device when the respective at least one sensor device paired with each wheel unit detect a specified deviation of the specified deflection of the wheel units relative to each other;

wherein at least one flexible connecting means is provided between the respective at least one sensor device paired with each wheel unit to deliver a measured variable that can be detected by the respective at least one sensor device paired with each wheel unit when the deflection of the wheel units relative to each other exceeds a specified deviation.

9. The vehicle according to claim 8, wherein the at least one connecting means provides a tensile or compressive load to the respect at least one sensor device paired with each wheel unit when the deflection of the wheel units relative to each other exceeds a specified deviation.

10. The vehicle according to claim 8, wherein at least two connecting means are provided between the respective at least one sensor device paired with each wheel unit, wherein each connecting means is anchored on a first side and configured on a second side to provide a tensile or compressive load to a respective sensor device when the deflection of the wheel units relative to each other exceeds a specified deviation.

11. The vehicle according to claim 8, wherein the respective at least one sensor device paired with each wheel unit comprise sensor means which are configured to detect a respective deflection of a wheel unit and to transmit same by means of at least one of a wireless or wired signal connection to the control unit or to further sensor devices.

12. The vehicle according to claim 8, wherein the steering system is a steer-by-wire steering system and does not include a central control unit for the wheel units.

13. The vehicle according to claim 8, wherein the wheel units are not connected via a mechanical steering means.

14. The vehicle according to claim 8, wherein the steering system comprises at least a first pair of wheel units and at least a second pair of wheel units, and wherein one of the pairs of wheel units is actuated depending on the deflection of the wheel units of the other pair of wheel units.

15. A method of use of a steering system for a vehicle comprising:

providing a steering system having:

at least one pair of wheel units that can be actuated and deflected independently of each other;

each wheel unit being paired with a respective at least one sensor device for detecting a deviation from a specified deflection of the wheel units relative to each other; and at least one of the wheel units being paired with at least one actuation device for actuating the at least one wheel unit;

at least one control unit configured to actuate the at least one actuation device when the sensor devices detect a specified deviation of the specified deflection of the at least one wheel unit relative to the other;

at least one flexible connecting means between the respective at least one sensor device paired with each wheel unit to deliver a measured variable that can be detected by the respective at least one sensor device paired with each wheel unit when the deflection of the wheel units relative to each other exceeds a specified deviation;

detecting a deviation from a specified deflection of the wheel units relative to each other with the respective at least one sensor device paired with each wheel unit based on the measured variable delivered by the at least one connecting means; and actuating the at least one actuation device in response to detecting the deviation to deflect at least one of the wheel units.

* * * * *